(12) United States Patent
Lin et al.

(10) Patent No.: US 7,551,729 B1
(45) Date of Patent: Jun. 23, 2009

(54) METHOD AND APPARATUS FOR INCREASING CHANNEL CAPACITY IN AN IP-BASED VOICE MESSAGING SYSTEM

(75) Inventors: Lin Lin, Belleville (CA); Ping Lin, Belleville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 839 days.

(21) Appl. No.: 10/955,164

(22) Filed: Sep. 30, 2004

(51) Int. Cl.
*H04M 1/64* (2006.01)
(52) U.S. Cl. ............... 379/88.25; 379/88.1; 379/88.16
(58) Field of Classification Search ............... 379/67.1, 379/88.1, 88.18, 88.04, 93.24, 100.08, 88.25, 379/88.16
See application file for complete search history.

(56) References Cited

U.S. PATENT DOCUMENTS 5,497,373 A * 3/1996 Hulen et al. ................ 370/259
5,987,100 A * 11/1999 Fortman et al. ............ 379/88.14
6,282,269 B1 * 8/2001 Bowater et al. ............ 379/88.17

* cited by examiner

*Primary Examiner*—Fan Tsang
*Assistant Examiner*—Akelaw A Teshale
(74) *Attorney, Agent, or Firm*—Ridout & Maybee LLP (57) ABSTRACT

A method and apparatus for increasing channel capacity in an Internet-based voice messaging system. Voice messages are stored in client mailboxes in the voice compression format they are received in a call answering session. During a message pickup session, the voice compression format of the retrieved message is compared to the voice compression formats or codecs supported by the user's terminal. If the voice compression format is not the same, re-negotiation is attempted, and if unsuccessful the voice message is transcoded prior to playback. If the voice compression format is the same, then the voice message is played back without transcoding. The voice message server also includes a voice prompt module which stores voice prompts in all the voice compression formats or codecs supported by the voice message server. The voice prompts are selected according to the supported voice compression format or codec and played back without the need for any transcoding.

19 Claims, 4 Drawing Sheets

METHOD AND APPARATUS FOR INCREASING CHANNEL CAPACITY IN AN IP-BASED VOICE MESSAGING SYSTEM

FIELD OF THE INVENTION

The present invention relates to communication systems and more particularly to a method and apparatus for increasing channel capacity in an Internet protocol (IP) based voice messaging system.

BACKGROUND OF THE INVENTION

Voice over Internet (i.e. VoIP) communication terminals provide the capability to receive both voice mail messages and conventional email or data messages. Such systems may incorporate unified messaging. In unified messaging, voice messages show up as items in an email inbox.

Voice messaging systems handle two types of calls or sessions. The first type comprises call answering sessions during which messages are left in the voice mail box for a client, i.e. a communication terminal. The second type comprises message pickup sessions. During a message pickup session, a client retrieves voice messages left in their inbox. When the client, i.e. user, retrieves the voice message at their terminal, a file is read from the message stored in the communication terminal and sent across the communication network to the message server to retrieve the voice message stream. The message server includes an inbox which stores the voice messages for the user.

Common traffic patterns for voice message systems have one voice message stored or deposited per call answer session, and multiple messages retrieved during a message pickup call or playback session. Based on this type of traffic pattern, the number of call answering sessions typically exceeds the number of message pickup sessions.

The traffic patterns for voice message systems have led to attempts to improve the handling of call traffic. Call traffic handling is typically impacted by the need to transcode voice messages which have been encoded using different types of codecs. Codecs comprise coders/encoders which convert the pulse coded modulation (PCM) voice data samples according to various voice compression formats, such as G.711, G.723.1 and G.729A. Transcoding requires execution by the digital signal processor (i.e. the CPU) on the voice message server and/or call server, and can be processor intensive.

One common idea in the art involves selecting a single codec at the voice message server to avoid the need for any transcoding and the resultant impact on digital signal processing resources. Two commonly used voice compression formats are the G.711 ITU Standard and the G.729A ITU Standard.

In one approach, the G.711 standard codec is used throughout the voice message system. This means that if a client terminal is talking over the network to an endpoint terminal operating with G.729A codec, then a gateway server needs to transcode between the G.711 format and the G.729A format. This requires digital signal processing and ties up processor resources at the gateway server. In addition, there is an impact on voice quality in the voice message because G.729A results in a lower voice quality than G.711. During a call answering session, the G.711 voice message is encoded in G.729A before arriving at the gateway server, which then decodes the voice message to G.711 format. If the voice message is subsequently retrieved on another G.729A endpoint, the voice message needs to re-encoded again in G.729A voice compression format. Since the G.729 voice compression technique introduces losses, two encodings from G.711 to G.729A can significantly degrade the voice quality of the original voice message.

In another approach, the G.729A codec is selected for voice compression in the voice message server. Since G.711 provides better voice quality, many users prefer the G.711 format for use within a site, e.g. a LAN, and the G.729A format is limited to use between sites to save on bandwidth for the WAN communications. Forcing all voice messages to be stored in G.729A format leads to a drop in voice quality for voice messages which remain within the site communication network or LAN, i.e. never cross the WAN.

Accordingly, there still remains a need for improving the voice messaging call traffic that can be handled by a given amount of hardware or system resources, while not unnecessarily degrading the voice quality of the voice messages.

BRIEF SUMMARY OF THE INVENTION

The present invention provides a method and apparatus for increasing voice messaging call traffic in a voice message system.

In a first embodiment, the present invention provides a method for retrieving one or more voice messages using a communication terminal during a message pickup session in a voice message system, the voice messages are stored in memory for the voice message system, the method comprises the steps of: retrieving the stored voice message, wherein the stored voice message comprises voice data encoded according to a voice compression format and the voice message was stored without transcoding; comparing the voice compression format for the stored voice message with one or more voice compression formats supported by the communication terminal; transcoding the stored voice message according to one of the voice compression formats supported by the communication terminal and playing back the stored voice message after transcoding, if the voice compression format for the stored voice message differs; playing back the stored voice message without transcoding, if the voice compression format for the stored voice message is compatible with one of the voice compression formats supported by the communication terminal.

In another embodiment, the present invention provides a voice message server for a communication system, the voice message server comprises: a plurality of mailboxes, each of the mailboxes includes memory for storing one or more voice messages associated with a user and making the stored voice messages available for playback; a transcoder, the transcoder comprises a plurality of codecs, each of the codecs provide a voice compression format for transcoding the voice messages retrieved from said mailboxes; a message processor, the message processor has a component for storing one or more of the voice messages in any of the mailboxes, the component for storing operating to store the voice messages without transcoding; the message processor includes a component for retrieving the voice messages from one of the mailboxes during a playback session, the component for retrieving includes a component for comparing the voice compression format of the stored voice message with the voice compression format supported by the user and generating a control if the voice compression formats differ; the transcoder is responsive to the control for transcoding the voice message prior to playback if the voice compression format differ; the message processor includes a component for bypassing the transcoder if the voice compression formats are the same.

In yet another embodiment, the present invention provides a mechanism in a voice messaging system for storing one or more voice messages associated with a subscriber to the voice messaging system, the voice messages are stored in a mailbox assigned to the subscriber, the mechanism comprises: a component for receiving the voice message, the voice message comprises a plurality of encoded voice samples, the voice samples are encoded according to a voice compression protocol; a component for storing the encoded voice samples in memory, the memory is associated with the mailbox assigned to the subscriber; wherein the component for storing writes the voice samples to the memory in the same voice compression protocol as for the received voice message.

In another aspect, the present invention provides an apparatus for retrieving one or more voice messages using a communication terminal during a playback session in a voice message system, the voice message being stored in memory for the voice message system, the apparatus comprises: means for retrieving the stored voice message, wherein the stored voice message comprises voice data encoded according to a voice compression format and the voice message is stored without converting the voice compression format; means for comparing the voice compression format for the stored voice message with one or more voice compression formats supported by the communication terminal; means for transcoding the stored voice message according to one of the voice compression formats supported by the communication terminal in response to the voice compression format for the stored voice message being different than the supported voice compression format, and means for playing back the stored voice message after said transcoding; means for playing back the stored voice message without transcoding in response to the voice compression format for the stored voice message being compatible with one of the voice compression formats supported by the communication terminal.

In a further aspect, the present invention provides a computer program product having a computer-readable medium tangibly embodying computer executable instructions for retrieving a voice message using a communication terminal, the voice message is stored on a voice message system, comprising: computer executable instructions for retrieving the stored voice message, wherein the stored voice message comprises voice data encoded according to a voice compression format, the voice message is stored without converting the voice compression format; computer executable instructions for comparing the voice compression format for the stored voice message with one or more voice compression formats supported by the communication terminal; computer executable instructions, responsive to a condition wherein the voice compression format for the stored voice message differs from the voice compression formats supported by the communication terminal, for transcoding the stored voice message according to one of the voice compression formats supported by the communication terminal and playing back the stored voice message after said transcoding; computer executable instructions, responsive to a condition wherein the voice compression format for the stored voice message is compatible one of the voice compression formats supported by the communication terminal, for playing back the stored voice message without transcoding.

Other aspects and functions of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the invention and in which.

In the drawings, like reference numerals indicate like elements.

DETAILED DESCRIPTION OF THE EMBODIMENTS

Figure 1:
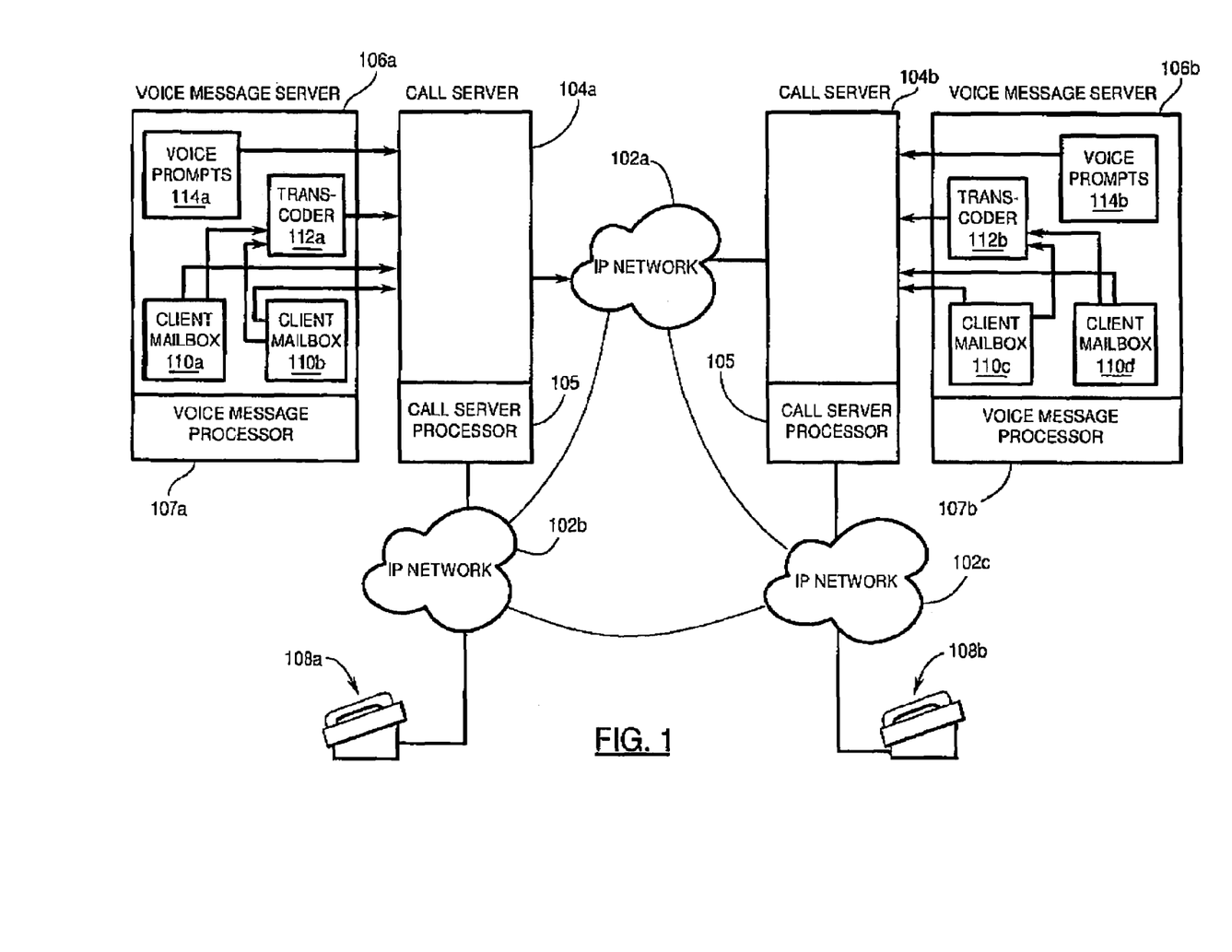
FIG. 1 shows in diagrammatic form an Internet phone system utilizing a voice messaging system in accordance with the present invention.

Reference is first made to FIG. 1 which shows in diagrammatic form an Internet phone system utilizing a voice message server and voice messaging call traffic processor according to the present invention. The Internet phone system is indicated generally by reference 100. While the present invention is described in the context of an Internet phone system, it will be appreciated that the invention has wider applicability and is suitable for other telecommunication systems or communication terminals.

As shown in FIG. 1, the Internet phone system 100 comprises a communication network 102, call servers 104 (indicated individually as 104a and 104b), voice message servers 106 and Internet telephones 108. In FIG. 1, the voice message servers 106 are shown individually as 106a, 106b. The communication network 102 comprises the Internet which is formed as a network of networks, indicated individually by references 102a, 102b and 102c in FIG. 1. The Internet 102 provides a wide area network for communication according to standardized and/or proprietary Internet protocols as will be within the understanding of those skilled in the art.

The Internet telephones 108 are shown individually as 108a, 108b and 108c, and may comprise the Nortel i2004™ series IP Telephone from Nortel Networks Inc. One or more of the Internet phones 108 may be replaced by a TDM (Time Division Multiplexed) phone for application in a hybrid system. The Internet telephones 108 include one or more function buttons (not shown) and work together with the call servers 104 to provide telephony features, such as, Call Forward, Call Transfer, and Conference. The call servers 104 include a call server processor or processing software indicated by reference 105 in FIG. 1. The implementation details for the call servers 104 and call server processors 105 will be within the understanding of those skilled in the art.

The voice message servers 106 (shown individually as 106a and 106b in FIG. 1) provide the functionality associated with the voice messaging and voice messaging interface in accordance with an aspect of the present invention as described in more detail below. The voice message server 106 comprises a voice messaging processor indicated by reference 107 in FIG. 1. The voice message processor 107 provides the functionality associated with the operation of the voice message server 106 and the functionality associated with the processes associated with the subject invention as described in more detail below.

Referring to FIG. 1, the voice message servers 106a and 106b include client mailboxes 110. The client mailboxes 110, indicated individually by references 110a, 110b, 110c and 110d, are configured for each client or subscriber for voice messaging. For example, the client terminal 108a is assigned the mailbox 110a on the voice message server 106a, and the client terminal 108b is assigned the mailbox 110b on the other voice message server 106b. The mailboxes 110 are allocated a block of memory in the message server 106 for storing voice and other types of messages which are left for associated user, i.e. client terminal 108.

As also shown in FIG. 1, the voice message servers 106 include transcoder modules 112, and voice prompt modules 114. The transcoder modules 112 are indicated individually by references 112a and 112b. The voice prompt modules 114 are indicated individually by references 114a and 114b. The transcoder module 112 may be implemented as a functional module and is associated with the voice message processor 107. The transcoder module 112 provides the voice compression formats and codecs supported by the voice message server 106. The voice compression formats/codecs include those defined according to the ITU standard, for example, G.711s, G.723.1, and G.729, and ADPCM (Adaptive Differential PCM or Pulse Code Modulation).

The voice prompts module 114 comprises memory for storing pre-recorded or "canned" voice prompts and commands associated with the voice messaging system. The stored voice prompts include, for example, the prompt to press the "#" key to access the company directory, the voice mail box is full, and so on. According to this aspect, the voice prompts module 114 stores the voice prompts in all the voice compression formats (i.e. codecs) supported by the voice message server 106. Similarly, personal greetings and spoken names are transcoded and stored in multiple voice compression formats (i.e. codecs) supported by the voice message server 106. For example, the voice prompts module 114 includes a set of voice prompts encoded in G.711, a set of voice prompts encoded in G.723.1, a set of voice prompts encoded in G.729 and a set of voice prompts encoded in ADPCM. As will be described in more detail below, this arrangement alleviates the need to transcode voice prompts for playback on the client terminal or phone 108.

The particular implementation details of the voice message servers 106 and/or the voice message processors 107 and their associated functionality/features as described above and below will be within the understanding of those skilled in the art.

Figure 2:
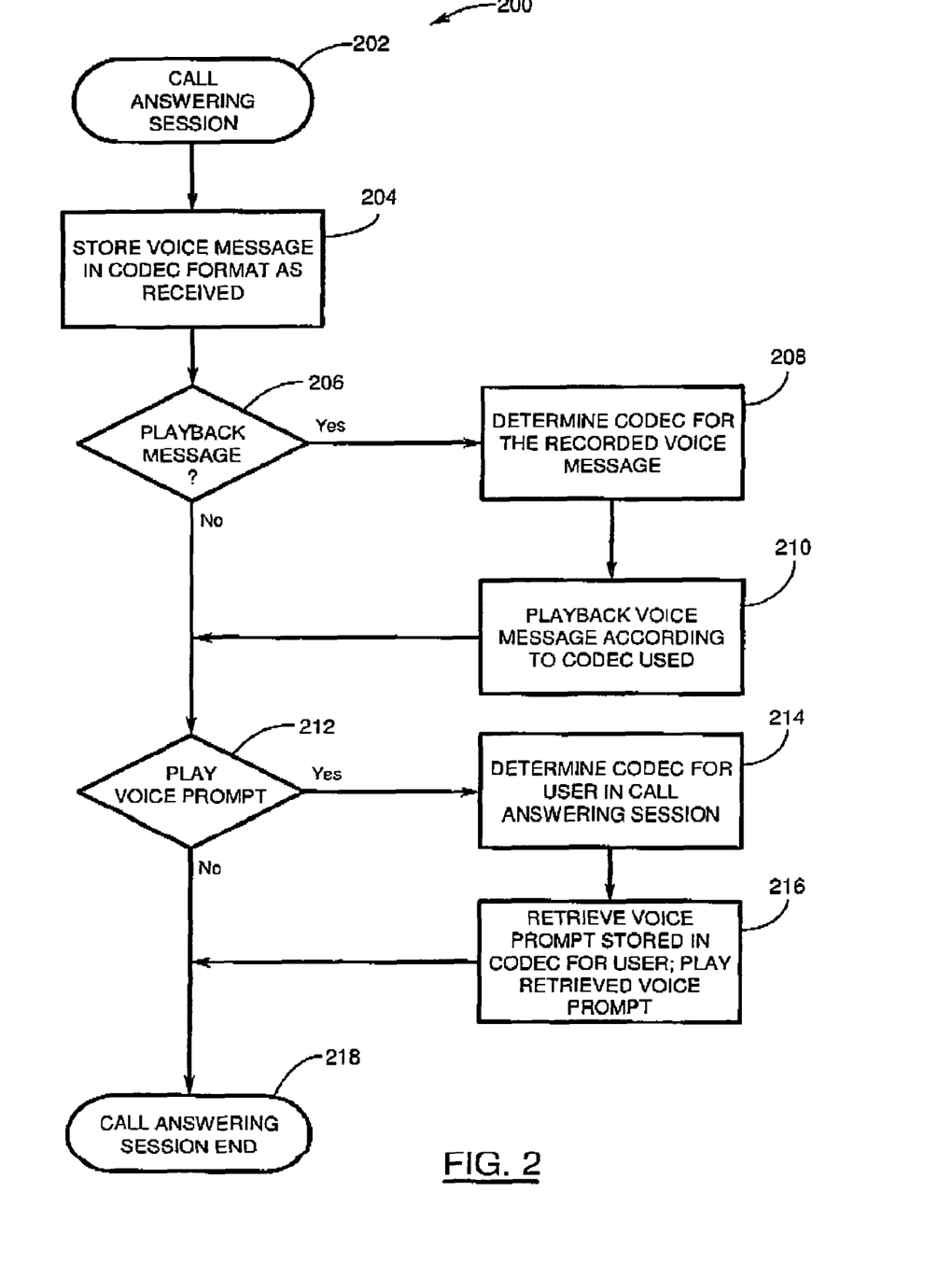
FIG. 2 shows in flow-chart a process for leaving a message during a call answering session in accordance with the present invention.

Reference is made to FIG. 2, which shows in flowchart form a process for leaving a voice message during a call answering session in accordance with an aspect of the present invention and indicated generally by reference 200. In step 202, the call answering session is initiated, i.e. a connection is made to the voice message server 106 (FIG. 1). The connection may be made by the call server 104 through the call server processor 105, for example, in response to the called or endpoint station (e.g. communication terminal 108b in FIG. 1) being on another call or in do not disturb mode. Next in step 204 and according to an aspect of the invention, the voice message is stored in the client mailbox 110c on the voice message server 106b (i.e. in memory allocated to the client mailbox 110c) in its current encoded format, i.e. no transcoding, conversion or translation of the voice message is performed before saving in memory. If the voice message server 106 includes a playback feature or function, the caller can request a playback of the voice message. If a playback is requested (decision block 206), the voice message server 106b (i.e. the voice message processor 107 determines the voice compression format, i.e. codec, for the voice message 208, and then plays back the voice message according to the codec that the message was received (block 210). If voice prompt playback is initiated (e.g. by the system 106 or by the user) in decision block 212, then the voice message processor 107 determines the codec being used by the client in the call answering session (block 214) and retrieves the voice prompt from the voice prompts module 112b (FIG. 1) for that codec and plays the voice prompt (block 216). After storing the voice and/or playing back the voice message and/or playing any voice prompts, the call answering session is ended by voice message server 106b, as indicated by block 218.

Figure 3:
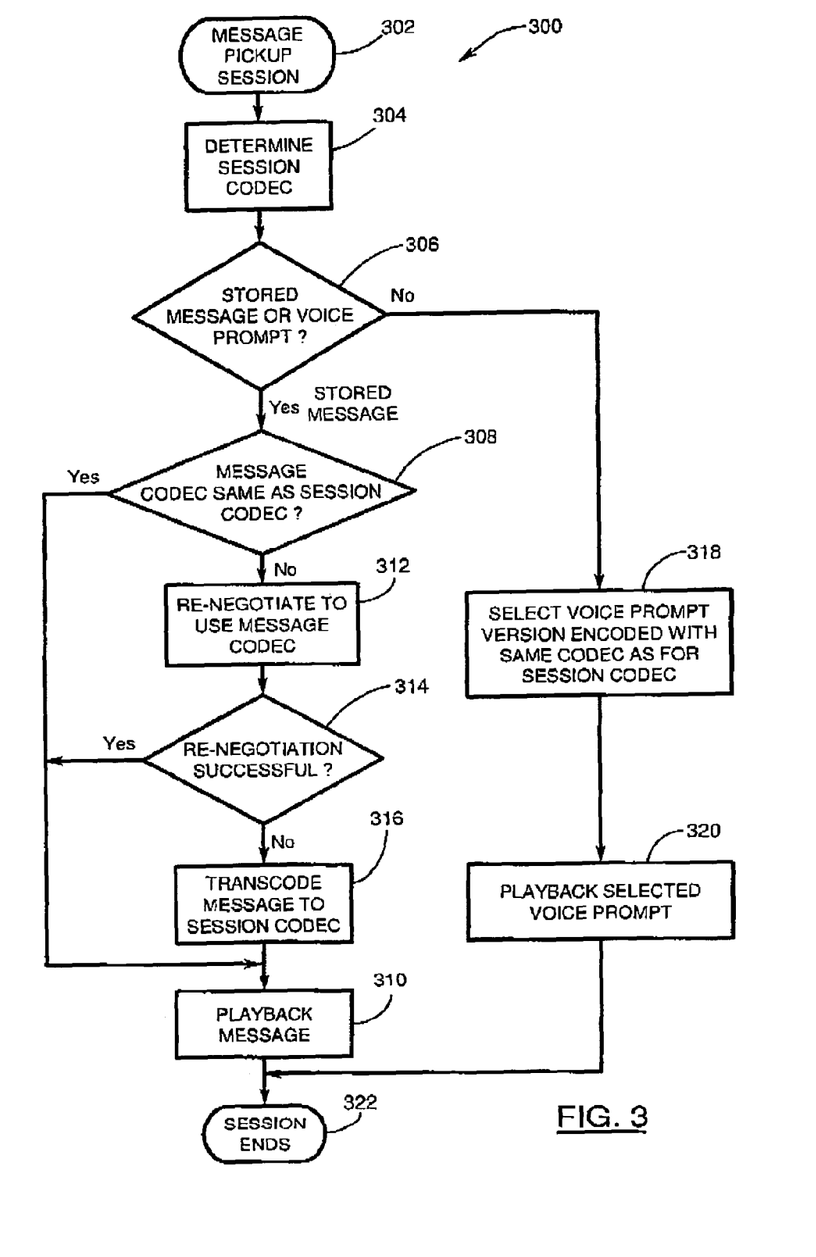
FIG. 3 shows in flow-chart form a process for retrieving a voice message during a message pickup session in accordance with the present invention for the voice messaging system of FIG. 1.

Reference is next made to FIG. 3, which shows in flowchart form a process for retrieving a voice message in accordance with another aspect of the present invention and indicated generally by reference 300. In step 302, a message pickup or playback session with the voice message server 106b (FIG. 1) is initiated, for example, in response to a client calling in to retrieve voice messages, or to change a personal voice mail greeting or spoken name. As indicated in block 304, the voice message server processor or voice message processing software 107 (FIG. 1) executes a function to determine a session voice compression format or session codec. The codecs supported by the user terminal 108a (FIG. 1) may be determined by a function in the voice message processor 107 which queries the user's messaging program and version or release present on the user's terminal. Codec support may also be determined through media negotiation conducted using the session initiation protocol or SIP as will be understood by one skilled in the art. Next, a function in the voice message processing software determines if a stored voice message or a voice prompt is being retrieved (decision block 306). According to this aspect, voice messages and voice prompts are handled differently. As described above, voice prompts, personal voice mail greetings and spoken names are stored in the voice compression formats or codecs supported by the system. If a voice message is being accessed, then a function determines if the codec for the stored voice message is the same as the codec for the user, i.e. the session codec, as indicated in decision block 308. If the message codec is the same, then a function in the voice message processor 107 plays the voice message back to the user (block 310) without transcoding. If the codec used for the voice message is not the same as the session codec (e.g. the codec supported by the user's terminal 108a) as determined in decision block 308, then a function in the voice message processing software attempts to re-negotiate with the user's terminal to use the codec or voice compression format that was used to originally encode the voice message, i.e. when the voice message was stored in the voice message system (block 312). If the re-negotiation is successful (as determined in decision block 314), then the voice message is retrieved without transcoding and played back to the user (block 310). If the re-negotiation is not successful (as determined in decision block 314), then a function transcodes the voice message to the session codec (block 316), and the voice message is played back (block 310). If there are no more messages to be played back, then the session is terminated by the voice message server or in response to a user input or action (block 322).

According to this aspect of the invention, the codec for playing back the voice message may be re-negotiated or changed during the message pickup session. If a re-negotiation is requested or a change in codec is indicated (decision block 308), e.g. the supported codec determined through media negotiation conducted using the session initiation protocol or SIP is not compatible with the codec format for the subsequent or second voice message, then and if the re-negotiation is not successful, the voice message processor 107 transcodes the voice message according to the supported codec (block 316) before playing the message back to the user (block 310). For example, if the voice messages initially played back during the message pickup session are encoded in G.711, but there is a stored voice message in G.729A, the voice message server 106 re-negotiates or initiates a change in the codecs, and switches the codec to G.729A before playing back the G.729A voice message, i.e., if the message codec differs from the session codec, then the session codec is re-negotiated to the message codec, and the message is played. If the re-negotiation is unsuccessful, then the message is transcoded to the session codec, and the transcoded message is played back to the user.

Referring again to FIG. 3, if the message being accessed is a voice prompt (or recorded personal greeting or spoken name) as determined in decision block 306, then the version of the stored voice prompt is selected which corresponds to the session voice compression format or session codec (block 318). The selected voice prompt is then played back to the user (block 320). The session is terminated by the system or in response to a user action (block 322).

Figure 4A:
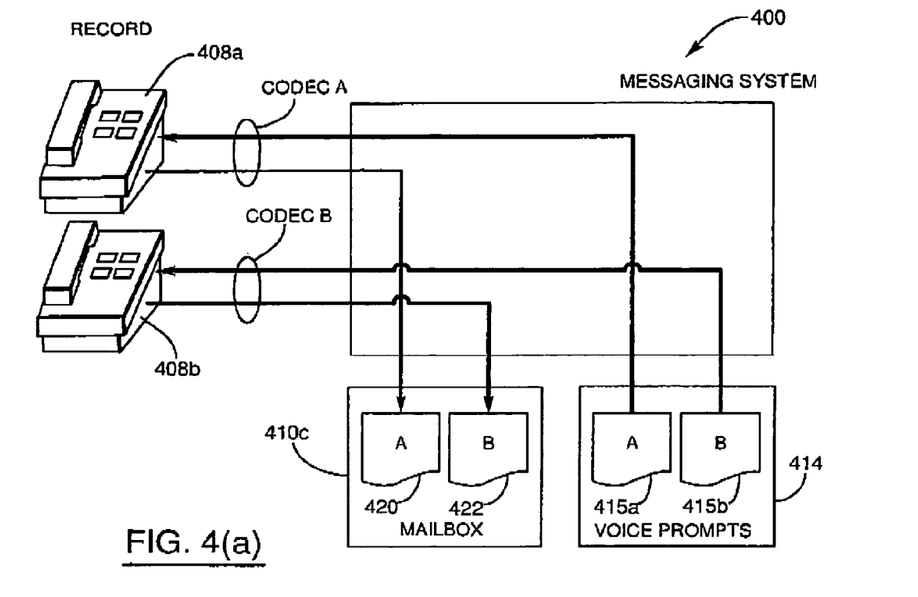
FIG. 4(a) shows in diagrammatic form operation of a messaging system for a call answer session in accordance with the present invention.

Reference is next made to FIG. 4(*a*), which shows operation of a voice messaging system 400, i.e. the voice message server 106, for a call answering or voice message record session according to the present invention. As shown in FIG. 4(*a*), two users, communication terminal 408*a* and communication terminal 408*b*, leave messages in a message mailbox 410*c* on the voice messaging system 400 belonging to a voice mail subscriber, i.e. user "c". The voice messaging system 400 also includes a voice prompt module 414. The voice prompt module 414 stores in memory a set of voice prompts associated with the operation of the voice messaging system 400 and for playback to a user or subscriber. As described above, a set of voice prompts and personal greetings and/or spoken names are stored in each of the codec or voice compression formats supported by the voice messaging system 400. In this example, a set of voice prompts are stored in G.729A (i.e. codec A) as indicated by reference 415*a*, and another set of voice prompts 415*b* are stored in G.711 (i.e. codec B). According to this aspect, the need for transcoding of the voice prompts, the personal greetings or spoken names for playback is eliminated.

For this example, user "a" uses the communication terminal 408*a* (e.g. an Internet phone, such as the Nortel i2004™ series IP telephone from Nortel Networks Inc.) to make a call over a VoIP network to the communication terminal (e.g. an Internet phone) belonging to the voice mail subscriber, i.e. user "c". The call to the communication terminal for user "c" over the Internet and other communication networks is completed using one or more call servers, for example as shown in FIG. 1, the operation of which will be well understood by those skilled in the art. In response to a busy signal, the sendpoint communication terminal 408*a* is directed to the mailbox 410*c* for user "c" on the voice messaging system 400. For this example, the sendpoint communication terminal 408*a* is configured for codec A (e.g. G.729A). Accordingly, any voice prompts, personal greetings or spoken names played back to the sendpoint communication terminal 408*a* are retrieved from the voice prompts 415*a* stored for codec A (e.g. G.729A). The sendpoint communication terminal 408*a* leaves a voice message indicated by reference 420. According to this aspect, the voice message 420 is stored in the mailbox 410*c* for user "c" in the form it is received (i.e. with no transcoding or conversion).

Referring again to FIG. 4(*a*), user "b" uses the communication terminal 408*b* (e.g. a Time Division Multiplex (TDM) phone) to make a call in hybrid system to the communication terminal (e.g. an Internet phone) for user "c". The call to the communication terminal for user "c" is completed using one or more call servers, the operation of which will be well understood by those skilled in the art. In response to a busy signal, the sendpoint communication terminal 408*b* is directed to the mailbox 410*a* for user "c" on the voice messaging system 400. For this example, the sendpoint communication terminal 408*b* is configured for codec B (e.g. G.711). Accordingly, any voice prompts, personal greetings or spoken names played back to the sendpoint communication terminal 408*b* are retrieved from the voice prompts 415*b* stored for codec B (e.g. G.711). The sendpoint communication terminal 408*b* leaves a voice message indicated by reference 422. According to this aspect, the voice message 422 is stored in the mailbox 410*c* for user "c" in the form it is received (i.e. with no transcoding or conversion).

Figure 4B:
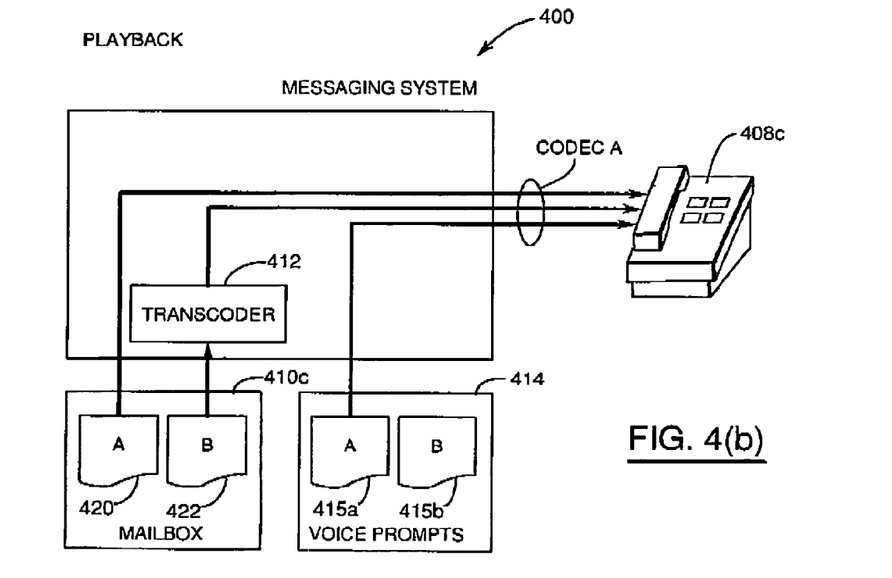
FIG. 4(b) shows in diagrammatic form operation of a messaging system for a message pickup session in accordance with the present invention.

Reference is next made to FIG. 4(*b*) which shows operation of the voice messaging system 400 for a message pickup or playback session according to the present invention. User "c" uses his communication terminal to connect or call the voice messaging system 400 to access his mailbox 410*c*. As shown and previously described with reference to FIG. 4(*a*), the user's mailbox 410*c* includes two voice messages 420 and 422. The first voice message 420 was stored according to codec A (e.g. G.729A), and the second voice message 422 was stored according to codec B (e.g. G.711). If the communication terminal for user "c" is configured for codec A, then the voice message 420 does not require transcoding, and the voice message 420 is played back to user "c". On the other hand, if user "c" attempts to retrieve the voice message 422 left by user "b" using codec B, then transcoding is necessary for playback. As shown, the voice messaging system 400 includes a transcoding module 412 (similar to that described above for FIG. 1) which transcodes or converts the voice message 422 from codec B to codec A for playback on the communication terminal for user "c".

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for retrieving one or more voice messages using a communication terminal during a playback session in a voice message system, the voice message being stored in memory for the voice message system, said method comprising:

retrieving the stored voice message, wherein the stored voice message comprises voice data encoded according to a voice compression format;

determining that the voice compression format for the stored voice message differs from the voice compression formats supported by the communication terminal;

transcoding the stored voice message according to one of the voice compression formats supported by the communication terminal; and playing back the stored voice message after said transcoding.

2. The method as claimed in claim 1, further including changing the codec for transcoding during playback in response to one of the voice messages having a voice compression format different from the voice compression format for the previous voice message.

3. The method as claimed in claim 2, further including playing a voice prompt, said voice prompt being selected from a plurality of voice prompts, each of said voice prompts being stored in more than one voice compression format, and said voice prompt for playback being selected according to the voice compression format compatible with the communication terminal.

4. The method as claimed in claim 1, further including playing a voice prompt, said voice prompt being selected from a plurality of voice prompts, each of said voice prompts being stored in more than one voice compression format, and said voice prompt for playback being selected according to the voice compression format compatible with the communication terminal.

5. A voice message server for a communication system, said voice message server comprising:

a plurality of mailboxes, each of said mailboxes including memory for storing one or more voice messages associated with a user and said stored voice messages being available for playback;

a transcoder, said transcoder comprising a plurality of codecs, each of said codecs providing a voice compression format for selectively transcoding said voice messages retrieved from said mailboxes;

a message processor, said message processor having a component for storing one or more of said voice messages in any of said mailboxes, said component for storing operating to store said voice messages without transcoding;

said message processor including a component for retrieving said voice messages from one of said mailboxes during a playback session, said component for retrieving having a component for comparing the voice compression format of the stored voice message with the voice compression formats supported by the user and generating a control if said voice compression formats differ;

said transcoder being responsive to said control for transcoding said voice message prior to playback if said voice compression formats differ;

said message processor including a component for bypassing said transcoder if said voice compression formats are the same.

6. The voice message server as claimed in claim 5, further including a voice prompts module, said voice prompts module comprising one or more sets of voice prompts, each of said sets of voice prompts being encoded in one of the voice compression formats, and said message processor including a component for selecting one of said sets of voice prompts based on the voice compression format being used for said playback session.

7. The voice message server as claimed in claim 6, wherein said message processor includes a component for changing the voice compression format during said playback session, said component for changing being responsive to change in the voice compression format of any one of the voice messages being retrieved during said playback session.

8. In a voice messaging system, a mechanism for retrieving one or more voice messages associated with a subscriber to the voice messaging system, the voice messages being stored in a mailbox assigned to the subscriber, said mechanism comprising:

a component for retrieving the voice message in response to a playback request from a communication terminal, the voice message comprising a plurality of voice samples encoded according to a voice compression protocol, and said communication terminal supporting one or more voice compression formats;

a component for comparing the voice compression protocol for the encoded voice samples with the voice compression formats supported by said communication terminal; and a component for transcoding the encoded voice samples responsive to determining that said voice compression format differs from said voice compression protocol, said component for transcoding applying said voice compression format to said voice samples prior to playback of the voice message.

9. The mechanism as claimed in claim 8, further including a component for storing voice prompts, said voice prompts comprising a plurality of sets of voice prompts, each of said sets of voice prompts being encoded in one of the voice compression formats.

10. The mechanism as claimed in claim 9, further including a component for changing the voice compression format during playback.

11. The mechanism as claimed in claim 10, wherein said component for changing the voice compression format is responsive to a change in the voice compression protocol of any of the voice messages.

12. An apparatus for retrieving one or more voice messages using a communication terminal during a playback session in a voice message system, the voice message being stored in memory for the voice message system, said apparatus comprising:

means for retrieving the stored voice message, wherein the stored voice message comprises voice data encoded according to a voice compression format, the voice message being stored without converting the voice compression format;

means for determining that the voice compression format for the stored voice message differs from the voice compression formats supported by the communication terminal;

means for transcoding the stored voice message according to one of the voice compression formats supported by the communication terminal in response to determining that the voice compression format for the stored voice message is different than said supported voice compression formats; and means for playing back the stored voice message after said transcoding.

13. The apparatus as claimed in claim 12, further including means for changing the codec for transcoding during playback in response to one of the voice messages having a voice compression format different from the voice compression format for the voice message previously played back during the session.

14. The apparatus as claimed in claim 13, further including means for playing a voice prompt, said voice prompt being selected from a plurality of voice prompts, each of said voice prompts being stored in more than one voice compression format, and said voice prompt for playback being selected according to the voice compression format compatible with the communication terminal.

15. The apparatus as claimed in claim 12, further including means for playing a voice prompt, said voice prompt being selected from a plurality of voice prompts, each of said voice prompts being stored in more than one voice compression format, and said voice prompt for playback being selected according to the voice compression format compatible with the communication terminal.

16. A computer program product having a computer-readable medium tangibly embodying computer executable instructions for retrieving a voice message using a communication terminal, said voice message being stored on a voice message system, comprising:
   computer executable instructions for retrieving the stored voice message, wherein the stored voice message comprises voice data encoded according to a voice compression format;
   computer executable instructions for determining that the voice compression format for the stored voice message differs from the voice compression formats supported by the communication terminal;
   computer executable instructions, responsive to determining that the voice compression format for the stored voice message differs from the voice compression formats supported by the communication terminal, for transcoding the stored voice message according to one of the voice compression formats supported by the communication terminal and for playing back the stored voice message after said transcoding.

17. The computer program product as claimed in claim 16, further including computer executable instructions for changing the codes for transcoding during playback in response to one of the voice messages having a voice compression format different from the voice compression format for the previous voice message.

18. The computer program product as claimed in claim 17, further including computer executable instructions for playing a voice prompt, said voice prompt being selected from a plurality of voice prompts, each of said voice prompts being stored in more than one voice compression format, and said voice prompt for playback being selected according to the voice compression format compatible with the communication terminal.

19. The computer program product as claimed in claim 18, further including computer executable instructions for playing a voice prompt, said voice prompt being selected from a plurality of voice prompts, each of said voice prompts being stored in more than one voice compression format, and said voice prompt for playback being selected according to the voice compression format compatible with the communication terminal.

\* \* \* \* \*